United States Patent
Kwak et al.

(10) Patent No.: US 11,642,798 B2
(45) Date of Patent: May 9, 2023

(54) METHOD AND SYSTEM FOR CHARGING ROBOT

(71) Applicant: LG ELECTRONICS INC., Seoul (KR)

(72) Inventors: Jae Ho Kwak, Seoul (KR); Won Hong Jeong, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 460 days.

(21) Appl. No.: 16/743,997

(22) Filed: Jan. 15, 2020

(65) Prior Publication Data

US 2021/0060801 A1    Mar. 4, 2021

(30) Foreign Application Priority Data

Aug. 27, 2019    (KR) ........................ 10-2019-0105254

(51) Int. Cl.
*G05B 19/418*    (2006.01)
*B25J 19/00*    (2006.01)
(Continued)

(52) U.S. Cl.
CPC ......... *B25J 19/0066* (2013.01); *B25J 9/0084* (2013.01); *B25J 9/163* (2013.01);
(Continued)

(58) Field of Classification Search
CPC ...... B25J 19/0066; B25J 9/0084; B25J 9/163; B25J 9/1664; B25J 9/1682; B25J 19/005; B25J 9/1661; B25J 11/008
See application file for complete search history.

(56) References Cited

U.S. PATENT DOCUMENTS 9,744,665 B1 *   8/2017   Linnell ...................... B25J 9/10
10,011,352 B1 *   7/2018   Dahlstrom ............... B64D 1/16
(Continued)

FOREIGN PATENT DOCUMENTS

KR      101648348      8/2016

OTHER PUBLICATIONS

Wireless PowerShare on your galaxy phone published on May 18, 2019 by Samsung (Year: 2019).*

*Primary Examiner* — Harry Y Oh
*Assistant Examiner* — Sohana Tanju Khayer
(74) *Attorney, Agent, or Firm* — Lee, Hong, Degerman, Kang & Waimey PC

(57) ABSTRACT

Disclosed are a method and a system for charging a robot. A method for charging a robot according to an embodiment of the present disclosure includes monitoring a battery level of a first robot which is providing a service, determining a charging robot for charging the first robot, from a plurality of second robots, when a battery level of the first robot falls below a first threshold level, and transmitting an instruction to move to a target position to the determined charging robot, in which determining the charging robot comprises determining the charging robot based at least partly on distances between the first robot and the second robots and battery levels of the second robots. Embodiments of the present disclosure may be implemented by executing an artificial intelligence algorithm and/or a machine learning algorithm in a 5G environment connected for Internet of Things.

20 Claims, 14 Drawing Sheets

(51) Int. Cl.
*B25J 9/00* (2006.01)
*B25J 9/16* (2006.01)
*B25J 11/00* (2006.01)

(52) U.S. Cl.
CPC ........... *B25J 9/1664* (2013.01); *B25J 9/1682* (2013.01); *B25J 19/005* (2013.01); *B25J 9/1661* (2013.01); *B25J 11/008* (2013.01)

(56) References Cited

U.S. PATENT DOCUMENTS

| | | | |
|---|---|---|---|
| 10,787,092 B2* | 9/2020 | Hou | B60L 58/13 |
| 11,235,890 B1* | 2/2022 | Dahlstrom | B64D 47/08 |
| 2008/0109114 A1* | 5/2008 | Orita | H02J 7/0027 |
| | | | 901/50 |
| 2016/0368464 A1* | 12/2016 | Hassounah | B60L 53/80 |
| 2018/0229852 A1* | 8/2018 | Boss | B60L 53/14 |
| 2018/0281949 A1* | 10/2018 | Mitchell | B64C 17/00 |
| 2019/0132719 A1* | 5/2019 | Mizutani | G05D 1/0088 |
| 2019/0224852 A1* | 7/2019 | Choi | B25J 19/00 |
| 2019/0366831 A1* | 12/2019 | Cafeo | B60R 16/03 |
| 2020/0238848 A1* | 7/2020 | Vliet | B60L 53/16 |
| 2021/0053221 A1* | 2/2021 | Jagannath | B25J 9/1682 |

* cited by examiner

METHOD AND SYSTEM FOR CHARGING ROBOT

CROSS-REFERENCE TO RELATED APPLICATION

Pursuant to 35 U.S.C. § 119(a), this application claims the benefit of earlier filing date and right of priority to Korean Patent Application No. 10-2019-0105254, filed on Aug. 27, 2019, the contents of which are hereby incorporated by reference herein in its entirety.

BACKGROUND

1. Technical Field

The present disclosure relates to a robot, and more particularly, to a method and system for charging a robot using a charging robot equipped with a charging module.

2. Description of Related Art

Recently, robots that may be conveniently used in daily life are being developed. Such robots are used to help people in their daily lives at homes, schools, and other public places. For example, service robots such as a guide robot, a delivery robot, a cooking robot, a serving robot, and a cleaning robot provide a specific service to people. A service space of the robots is gradually expanded from a small space such as a home to a large space such as an airport. The number of service robots in operation has also increased.

The robot has a built-in rechargeable battery, and the robot moves to a charging stand or a charging station to charge the battery when the battery level is insufficient. The robot is docked with the charging stand or a designated position of the charging station and supplied with power from the charging stand or the charging station to charge the battery.

However, when the battery of the robot is run out while providing a service, the robot needs to stop providing the service to return to the charging station. Such service interruption may cause inefficiency in an operation of a robot system. Further, when the robot is discharged while providing the service, a manager needs to directly transport the corresponding robot so that management personnel may be unnecessarily consumed.

Korean Registered Patent Publication No. 10-1648348 discloses a robot cleaning system in which when a robot cleaner is present in a wireless charging area, the robot cleaner cleans an area corresponding to the wireless charging area while wirelessly receiving a transmitted power.

However, when it is considered that a service space of the robot is gradually expanded and the number of operated service robots is increased, the disclosed system cannot sufficiently solve the above-described problems.

In an environment where a plurality of robots provides various services, there is a demand to prevent the service interruption due to the discharged battery of the robot and improve the efficiency of the overall robot system. Further, there is a demand to minimize the management personnel to be put due to the discharging of the robot.

SUMMARY OF THE INVENTION

Embodiments of the present disclosure provide a method and a system which prevent the interruption of the service which is being provided due to the battery discharge of the robot.

Embodiments of the present disclosure provide a method and a system which minimize the management personnel to be put due to the battery discharge of the robot.

Embodiments of the present disclosure provide a method and a system which allow robots to communicate with each other to charge a battery.

The objects of the present disclosure are not limited to the objects described above, and other objects and advantages not described in the present disclosure can be understood by the following description and will be understood more reliably by an embodiment of the present disclosure. Moreover, aspects of the present disclosure may be realized by the means and combinations thereof indicated in claims.

A method and a system for charging a robot according to an embodiment of the present disclosure determine a charging robot to charge a first robot from second robots, at least partially based on distances between the first robot and the second robots and battery levels of the second robots.

According to an aspect of the present disclosure, a method for charging a robot includes: monitoring a battery level of a first robot which is providing a service; determining a charging robot for charging the first robot, from a plurality of second robots, when a battery level of the first robot falls below a first threshold level, and transmitting an instruction to move to a target position to the determined charging robot.

The determining the charging robot may comprise determining the charging robot based at least partly on distances between the first robot and the second robots and battery levels of the second robots.

The determining the charging robot may comprise selecting robots having a battery level which is higher than a second threshold level from the plurality of second robots; and determining a robot which is the closest to a current position of the first robot from the selected robots as the charging robot, and the target position may be a current position of the first robot.

The method may further comprise: determining the second threshold level based on an energy required to finish the service.

The determining the charging robot may comprise selecting robots having a battery level which is higher than a second threshold level from the plurality of second robots; and determining a robot which is the closest to an expected position of the first robot from the selected robots as the charging robot, the target position may be an expected position of the first robot.

The method may further comprise: stopping charging by the charging robot when the battery level of the first robot exceeds a third threshold level; determining a charging station to which the charging robot will return; and transmitting an instruction to return to the determined charging station to the charging robot.

The method may further comprise: monitoring a battery level of the charging robot; stopping charging by the charging robot when the battery level of the charging robot falls below a fourth threshold level; determining a charging station to which the charging robot will return; and transmitting an instruction to return to the determined charging station to the charging robot.

The determining the charging station to which the charging robot will return comprises: determining the charging station to which the charging robot will return, based on at least one of distances between the charging robot and charging stations, a number of empty spaces of each charging station, or an occupancy ratio of each charging station.

The method may further comprise: determining the fourth threshold level based on at least one of distances between the charging robot and charging stations, a number of empty spaces of each charging station, or an occupancy ratio of each charging station.

The method may further comprise: determining a second charging robot to charge at least one of the first robot or the charging robot, from the plurality of second robots, when there is no charging station to which the charging robot can return, and transmitting an instruction to move to the first robot or the charging robot to the determined second charging robot.

The method may further comprise: training an artificial neural network using status information of the first robot, status information of the second robots, and the determined charging robot as learning data, and the status information includes a battery level and a position.

The method may further comprise: determining the charging robot by applying the status information of the first robot and the status information of the second robots to the artificial neural network.

According to another aspect of the present disclosure, a method for charging a robot includes: monitoring, by a first robot, a battery level of the first robot; broadcasting a first message indicating that it is necessary to charge the battery, when the battery level falls below a first threshold level; receiving, by the first robot from at least one second robot, a response message including a position and a battery level of the second robot, in response to the first message; determining, by the first robot, a charging robot based on the position and the battery level of the second robot, from the at least one second robot; and transmitting, by the first robot, a second message to move to a target position to the charging robot.

The determining the charging robot may comprise selecting robots having a battery level which is higher than a second threshold level from the second robots which transmitted the response message; and determining a robot which is the closest to a current position of the first robot from the selected robots as the charging robot, and the target position may be a current position of the first robot.

The determining the charging robot may comprise selecting robots having a battery level which is higher than a second threshold level from the second robots which transmitted the response message; and determining a robot which is the closest to an expected position of the first robot from the selected robots as the charging robot, and the target position may be an expected position of the first robot.

The first message may include a battery level and a position of the first robot.

According to another aspect of the present disclosure, a method for charging a robot: receiving, by a second robot, a first message indicating that it is necessary to charge a battery from a first robot; transmitting, by the second robot, a response message including a battery level and a position of the second robot to the first robot, in response to receiving the first message; and receiving, by the second robot, a second message to move to a target position to charge from the first robot, in response to transmitting the response message.

The method may further comprise: monitoring, by the second robot, a battery level of the second robot; determining, by the second robot, a charging station to return, when the battery level of the second robot falls below a fourth threshold level; and transmitting, by the second robot, a stopping message indicating the returning to the determined charging station to the first robot.

The determining the charging station to return may comprise determining the charging station to return based on at least one of distances between the second robot and charging stations, a number of empty spaces of each charging station, or an occupancy ratio of each charging station.

The method may further comprise: when there is no charging station to return, broadcasting, by the second robot, a third message indicating that it is necessary to charge a battery.

A system for charging a robot according to an embodiment of the present disclosure may comprise: a first robot including a power reception module, a plurality of second robots including a power transmission module which supplies a power to the power reception module, and a control server and in which the control server monitors a battery level of the first robot, when the battery level of the first robot falls below a first threshold level, determines a charging robot to charge the first robot, from the plurality of second robots, based at least partly on distances between the first robot and the second robots and battery levels of the second robots, and allows the determined charging robot to supply the power to the power reception module of the first robot.

In a computer-readable storage medium according to an embodiment of the present disclosure, a program code is stored and when the program code is executed, the program code allows at least one processor to perform the above-described methods.

According to the embodiments of the present disclosure, the charging robot can be dispatched to a service robot which is providing a service so that the interruption of the service which is being provided may be prevented.

According to the embodiments of the present disclosure, the management personnel to be put due to the battery discharge of the robot may be minimized.

According to the embodiments of the present disclosure, the robots communicate with each other without passing through a control server to charge a battery.

Effects of the present disclosure are not limited to the above-mentioned effects, and other effects, not mentioned above, will be clearly understood by those skilled in the art from the description of claims.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
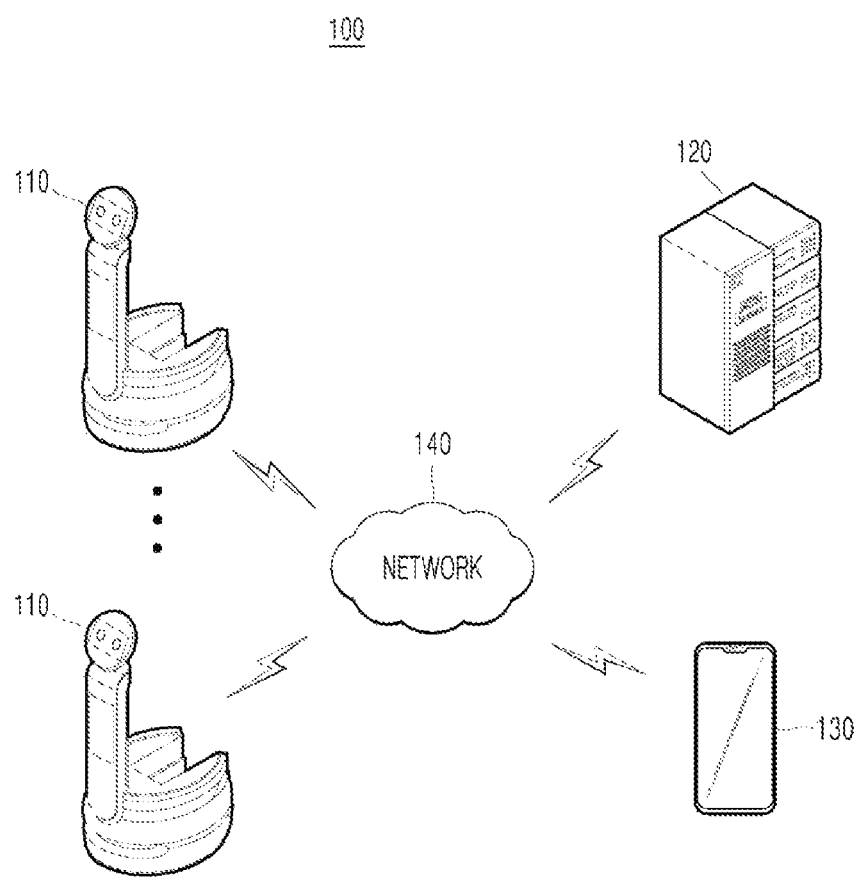
FIG. 1 is a view illustrating a robot system according to an embodiment of the present disclosure.

In what follows, embodiments disclosed in this document will be described in detail with reference to appended drawings, where the same or similar constituent elements are given the same reference number irrespective of their drawing symbols, and repeated descriptions thereof will be omitted. In the following description, the terms "module" and "unit" for referring to elements are assigned and used exchangeably in consideration of convenience of explanation, and thus, the terms per se do not necessarily have different meanings or functions. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

It will be understood that, although the terms "first", "second", and the like may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

FIG. 1 is a view illustrating a robot system according to an embodiment of the present disclosure. Referring to FIG. 1, a robot system according to an embodiment of the present disclosure includes one or more robots 110 and a control server 120 and selectively further includes a terminal 130.

One or more robots 110, the control server 120, and the terminal 130 may be connected to each other via a network 140. The one or more robots 110, the control server 120, and the terminal 130 may communicate with each other via a base station, but may directly communicate without passing through the base station.

The one or more robots 110 may perform a task in a space, and provide information or data related to the task for the control server 120. A workspace of a robot may be indoors or outdoors. A robot may be operated in a space predefined by a wall or a column. In this case, a workspace of a robot may be defined in various ways depending on the design purpose, working attributes of the robot, mobility of the robot, and other factors. A robot may be operated in an open space, which is not predefined. The robot may also sense a surrounding environment and determine a workspace by its own accord.

The one or more robots 110 may provide their own status information or data to the control server 120. The status information of the robot 110 may include information about a battery level and a position of the robot 110.

The control server 120 may perform various analysis based on information or data provided by the one or more robots 110, and control overall operation of a robot system based on the analysis result. In an aspect, the control server 120 may directly control driving of the robot 110 based on the analysis result. In another aspect, the control server 120 may derive and output useful information or data from the analysis result. In still another aspect, the control server 120 may adjust parameters in a robot system using the derived information or data. The control server 120 may be implemented as a single server but may be implemented as a plurality of server sets, a cloud server, or a combination thereof.

The terminal 130 may share a portion of a role of the control server 120. In an aspect, the terminal 130 may obtain information or data from the one or more robots 110 and provide the information or data for the control server 120, or may obtain information or data from the control server 120 and provide the information or data for the one or more robots 110. In another aspect, the terminal 130 may share at least a portion of analysis to be performed by the control server 120, and may provide a result of the analysis for the control server 120. In still another aspect, the terminal 130 may receive an analysis result, information, or data from the control server 120, and may simply output the analysis result, information, or data.

The terminal 130 may replace the control server 120. At least one robot of a plurality of robots 110 may replace the control server 120. In this case, the plurality of robots 110 may be connected to communicate with each other.

The terminal 130 may include various electronic devices capable of communicating with the robot 110 and the control server 120. The terminal 130 may be implemented as a stationary terminal and a mobile terminal, such as a mobile phone, a projector, a cellular phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and digital signage.

The network 140 may refer to a network which composes a portion of a cloud computing infrastructure or which is provided in a cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multi access (CDMA), Wideband CDMA (WCDMA), long term evolution (LTE), long term evolution-advanced (LTE-A), 5G (generation) communications, Bluetooth™, or satellite communications, but is not limited thereto.

The network 140 may include connection of network elements such as hubs, bridges, routers, switches, and gateways. The network 140 can include one or more connected networks, for example, a multi-network environment, including a public network such as an internet and a private network such as a safe corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

When the battery of the robot 110 which is providing a service is run out, the robot 110 needs to stop the service which is being provided in order to return to the charging station. Such service interruption may cause inefficiency in an operation of a robot system. Further, when the robot is discharged while providing the service, a manager needs to directly transport the robot so that management personnel may be unnecessarily consumed.

Therefore, embodiments of the present disclosure provide measures to prevent the service interruption due to the battery discharge of the robot 110 and improve an efficiency of the overall robot system in an environment where one or more robots 110 provide various services.

In the present disclosure, one or more robots 110 may be classified respectively, as any one of a service robot, a standby robot, and a charging robot depending on a given role.

The "service robot" refers to a robot which is providing a specific service in accordance with a control signal from the control server 120 or the terminal 130 or an input signal from a user. For example, the service robot may include a guide robot which guides the user to a specific position, a delivery robot which delivers a product to a destination, and a cleaning robot which cleans a specific space.

The "charging robot" refers to a robot which has a role to charge the other robot such as a service robot or a standby robot. The charging robot may include a robot which is moving to a target position to charge or a robot which is charging another robot.

The "standby robot" refers to a robot other than the service robot and the charging robot. For example, the standby robot may include a robot which is waiting for a service request in a specific position, a robot which is charging its battery in a charging station, and a robot which finishes the service providing. The standby robot may include not only a robot which is in a stop state, but also a robot which is on the move (for example, a robot which finishes the service providing or charging of another robot to return to the charging station).

The above-described classification is not absolute, but may vary in accordance with the change of the role. That is, an arbitrary robot may be a service robot when a service is being provided, or a standby robot when the service providing is finished, or a charging robot when the robot charges another robot.

In another embodiment, the robot may be designed to perform only a specific role. Some robots may be configured to provide services only and the other robots may be configured to charge the other robots only. In the present disclosure, a "service-only robot" may indicate a robot dedicated to provide a service and a "charging-only robot" may indicate a robot dedicated to charge another robot.

Figure 2:
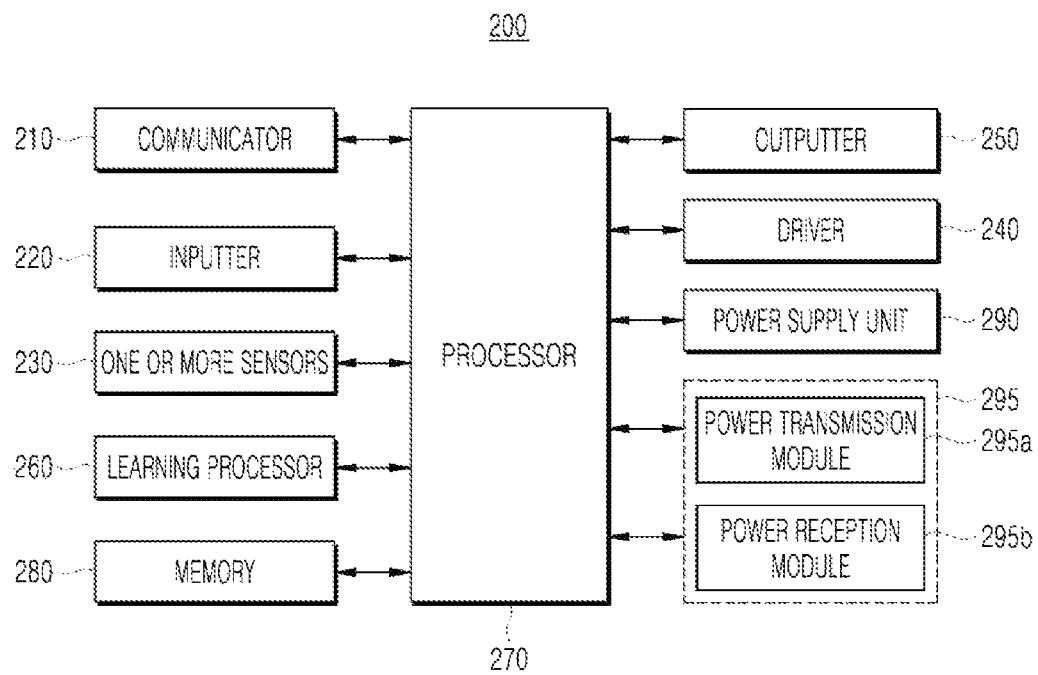
FIG. 2 is a block diagram illustrating a configuration of a robot according to an embodiment of the present disclosure.
Figure 3:
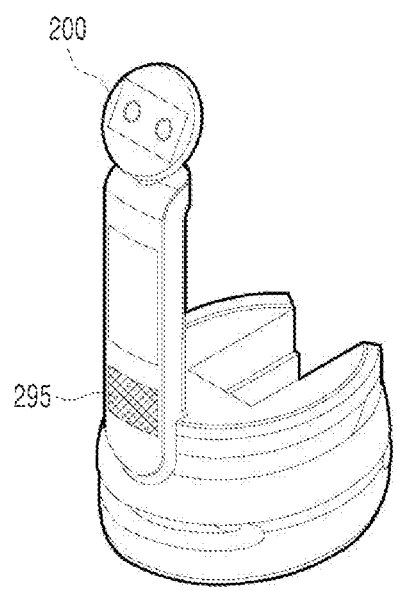
FIG. 3 is a view illustrating a charger of a robot according to an embodiment of the present disclosure.

FIG. 2 is a block diagram illustrating a configuration of a robot according to an embodiment of the present disclosure and FIG. 3 is a view illustrating an outer appearance of a robot according to an embodiment of the present disclosure.

Referring to FIG. 2, a robot 200 according to an embodiment of the present disclosure includes a communicator 210, an inputter 220, one or more sensors 230, a driver 240, an outputter 250, a processor 270, a memory 280, a power supply unit 290, and a charger 295.

The communicator 210 may transmit and receive information or data with external devices such as the control server 120, or the terminal 130 using wired or wireless communication technology. For example, the communicator 210 may transmit or receive sensor data, user input, a learning model, a control signal, and the like with the external devices. The communicator 210 may use the communication technology, such as Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

The inputter 220 may obtain various types of data. The inputter 220 may include at least one camera for obtaining a video signal, a microphone for obtaining an audio signal, and a user interface for receiving information from a user.

The inputter 220 may obtain, for example, learning data for model learning and input data used when output is obtained using a learning model. The inputter 220 may obtain raw input data. In this case, the processor 270 or the learning processor 260 may extract an input feature by preprocessing the input data.

The one or more sensors 230 may obtain at least one of internal information of the robot 200, surrounding environment information of the robot 200, or user information by using various sensors. The one or more sensors 230 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The driver 240 physically drives the robot 200. The driver 240 may include an actuator or a motor which operates in accordance with a control signal from the processor 270. The driver 240 may include a wheel, a break, a propeller or the like, which operates by the actuator or the motor.

The outputter 250 may generate a visual, auditory, or tactile related output. The outputter 250 may include a display outputting visual information, a speaker outputting auditory information, and a haptic module outputting tactile information.

The memory 280 may store data supporting various functions of the robot 200. The memory 280 may store information or data received by the communicator 210, and input information, input data, learning data, a learning model, and a learning history obtained by the inputter 220.

The power supply unit 290 is applied with external power or internal power to supply the power to the components included in the robot 200 under the control of the processor 270. The power supply unit 290 includes a battery and the battery is a built-in battery or a replaceable battery.

The charger 295 may include at least one of a power transmission module 295a which transmits a power from the power supply unit 290 to the outside and a power reception module 295b which receives a power from the outside. The service-only robot may include at least the power reception module 295b and the charge-only robot may include at least the power transmission module 295a. The power transmitted from the power transmission module 295a may be used to charge a battery of an external device and the power which is received by the power reception module 295b from the outside may be used to charge the battery of the power supply unit 290.

The charger 295 may wirelessly transmit and receive the power. The power transmission module 295a and the power reception module 295b may transmit and receive the power, respectively, using various methods which are known to those skilled in the art, such as an electromagnetic induction method, a radio wave reception method, and a magnetic field resonance method.

Referring to FIG. 3, the charger 295 may be disposed on the outer surface of the robot 200 to be in contact with or approach a charger of the other robot. Various positions of the charger 295 may be selected in accordance with a structure, a shape of the robot 200 and a matching property with the other robot.

The processor 270 may determine at least one executable operation of the robot 200 based on information which is determined or generated using a data analysis algorithm and a machine learning algorithm. Further, the processor 270 may perform the operation determined by controlling components of the robot 200.

The processor 270 may request, search, receive, or utilize the information or the data of the learning processor 260 or the memory 280 and control components of the robot 200 to execute a predicted operation or a desired operation among the at least one executable operation. In this case, when connection with an external device such as the control server 120, or the terminal 130 is necessary to perform the determined operation, the processor 270 may generate a control signal to control the corresponding external device, and may transmit the generated control signal to the corresponding external device.

The processor 270 may control at least some of components of the robot 200 to drive an application stored in the memory 280. Furthermore, the processor 270 may operate two or more components included in the robot 200 in combination with each other to drive the application.

In an embodiment, the processor 270 transmits information about the battery level of the power supply unit 290 to the control server 120. Further, the processor 270 determines the position of the robot 200 based on data or information from at least one of the communicator 210, the inputter 220, and the sensor 240, and transmits the information about the position of the robot 200 to the control server 120.

Figure 4:
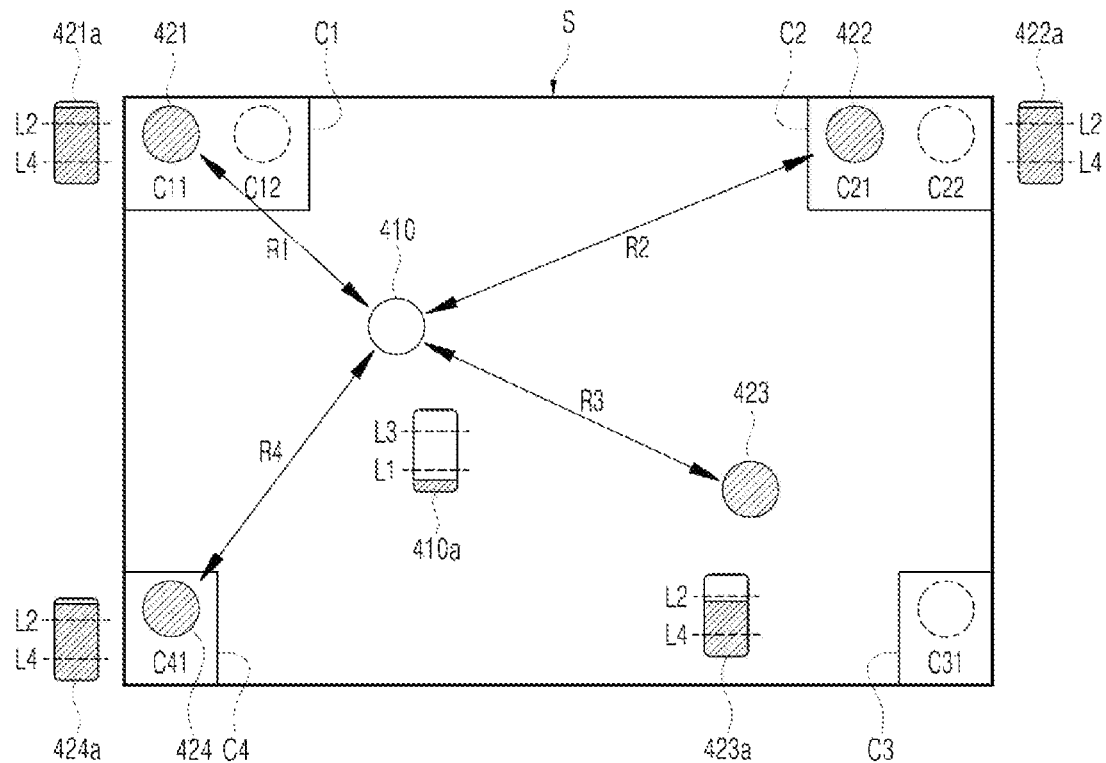
FIG. 4 is an exemplary diagram for explaining a method of determining a charging robot in a robot system according to an embodiment of the present disclosure.

FIG. 4 is an exemplary diagram for explaining a method of determining a charging robot in a robot system according to an embodiment of the present disclosure. FIG. 4 illustrates a situation that the charging robot is dispatched to charge the service robot 410.

Referring to FIG. 4, a space S where the service robot 410 provides a service may be defined. In a space S, a plurality of charging stations C1, C2, C3, and C4 may be provided. The charging station C1 includes two charging spaces C11 and C12 and the charging station C2 includes two charging spaces C21 and C22. The charging station C3 includes one charging space C31 and the charging station C4 includes one charging space C41.

In the space S, a plurality of standby robots 421, 422, 423, and 424 may be provided. The plurality of standby robots 421, 422, 423, and 424 has a charger 295 including at least a power transmission module 295a. In FIG. 4, the standby robot 421 is located in the charging space C11 of the charging station C1, the standby robot 422 is located in the charging space C21 of the charging station C2, and the standby robot 424 is located in the charging space C41 of the charging station C4. The standby robot 423 is located in the space S. As a result, the charging space C12 of the charging station C1, the charging space C22 of the charging station C2, and the charging space C31 of the charging station C3 are empty.

Even though not illustrated in FIG. 4, the service robot 410 and the standby robots 421, 422, 423, and 424 are connected to communicate with the control server 120 and transmit its own status information including a battery level and a position to the control server 120. When the space S is mapped to the coordinate system, the positions of the service robot 410 and the standby robots 421, 422, 423, and 424 may be represented by a two-dimensional coordinate (x, y). The status information may be periodically provided to the control server 120 or provided to the control server 120 upon the request from the control server 120.

Referring to FIG. 4, a battery state 410a of the service robot 410 and battery states 421a, 422a, 423a, and 424a of the standby robots 421, 422, 423, and 424 are illustrated.

The battery state 410a of the service robot 410 may be associated with a first threshold level L1 and a third threshold level L3.

The first threshold level L1 may be a battery level indicating that it is necessary to charge the battery of the service robot 410. The first threshold level L1 may be a reference for determining whether to dispatch the charging robot. In an embodiment, the first threshold level L1 may be a reference for determining that the service robot 410 cannot finish the service which is being provided or the service robot 410 cannot return to an initial position or cannot provide a subsequent service after providing the service.

The third threshold level L3 may be a battery level indicating that it is not necessary to charge the battery of the service robot 410. The third threshold level L3 may be a reference for determining whether to return the charging robot. The third threshold level L3 may be a reference for determining that the service robot 410 can finish the service which is being provided or the service robot 410 can return to an initial position or provide a subsequent service after providing the service.

The battery states 421a, 422a, 423a, and 424a of the standby robots 421, 422, 423, and 424 may be associated with a second threshold level L2 and a fourth threshold level L4.

The second threshold level L2 may be a minimum battery level required for the standby robot to charge the service robot 410. The second threshold level L2 may be a reference for determining the standby robot as a charging robot.

The fourth threshold level L4 may be a minimum battery level required for the charging robot to return to the charging station. The fourth threshold level L4 may be a reference for determining whether to return the charging robot or dispatch an additional charging robot.

The above-described threshold levels L1, L2, L3, and L4 may be set in advance based on battery specifications of the service robot 410 and the standby robots 421, 422, 423, and 424, a type and an attribute of a service provided by the service robot 410, a type and an attribute of a subsequent service provided by the service robot 410, a size of the space S, a position of the charging station, or any combinations thereof.

In another embodiment, at least some of threshold levels L1, L2, L3, and L4 described above may be dynamically changed by the control server 120. For example, the control server 120 may dynamically change the first threshold level L1 based on an electric energy required to finish the service which is being provided by the service robot 410. As another example, the control server 120 may dynamically change the second threshold level L2 based on at least one of an electric energy required to finish the service which is being provided by the service robot 410 or an average electric energy per unit distance required to move the standby robots 421, 422, 423, and 424. As still another example, the control server 120 may dynamically change the fourth threshold level L4 based on a position of the charging robot, positions of the charging stations, an average electric energy per unit distance required to move the charging robot, a number of empty charging spaces of the charging stations, a number of standby robots located in the charging stations, a battery level, an occupancy ratio of the charging stations, or any combinations thereof.

The control server 120 monitors the battery level of the service robot 410. When the battery level of the service robot 410 falls below the first threshold level L1, the control server 120 may determine a charging robot for charging the service robot 410 from the standby robots 421, 422, 423, and 424. The control server 120 may determine a charging robot based on distances R1, R2, R3, and R4 between the service robot 410 and the standby robots 421, 422, 423, and 424 and the battery levels of the standby robots 421, 422, 423, and 424.

In an embodiment, the control server 120 selects robots having a higher battery level than the second threshold level L2 from the standby robots 421, 422, 423, and 424 and determines a robot which is the closest to the current position of the service robot 410 among the selected robots as a charging robot. For example, in FIG. 4, a standby robot 421 which is the closest to the current position of the service robot 410 among the standby robots 421, 422, and 424 having a higher battery level than the second threshold level L2 may be determined as a charging robot. In another embodiment, the control server 120 selects robots located within a range determined in advance from the current position of the service robot 410 and determines a robot having the highest battery level among the selected robots as a charging robot. Since the charging robot is determined with respect to the current position of the service robot 410, the embodiments may be applied when the service robot 410 provides a service in a stop state or provides a service in a comparatively narrow range.

The control server 120 may transmit an instruction to move to a target position to the determined charging robot. The charging robot which receives the instruction may move to the target position to charge the service robot 410. In an embodiment, the target position may be a current position of the service robot 410. For example, the standby robot 421 which receives the instruction from the control server 120 in FIG. 4 moves to the current position of the service robot 410 to charge the service robot 410.

In order to charge the service robot 410, chargers of the service robot 410 and the charging robot may be in contact with each other or aligned to be close to each other. The alignment may be performed by various methods known to those skilled in the art. For example, the control server 120 controls at least one of two robots to chargeably align the two robots. As another example, two robots communicate with each other and adjust their own poses to be chargeably aligned. In addition, means for fixing the aligned two robots may be provided in at least one of the service robot 410 and the charging robot.

Figure 5:
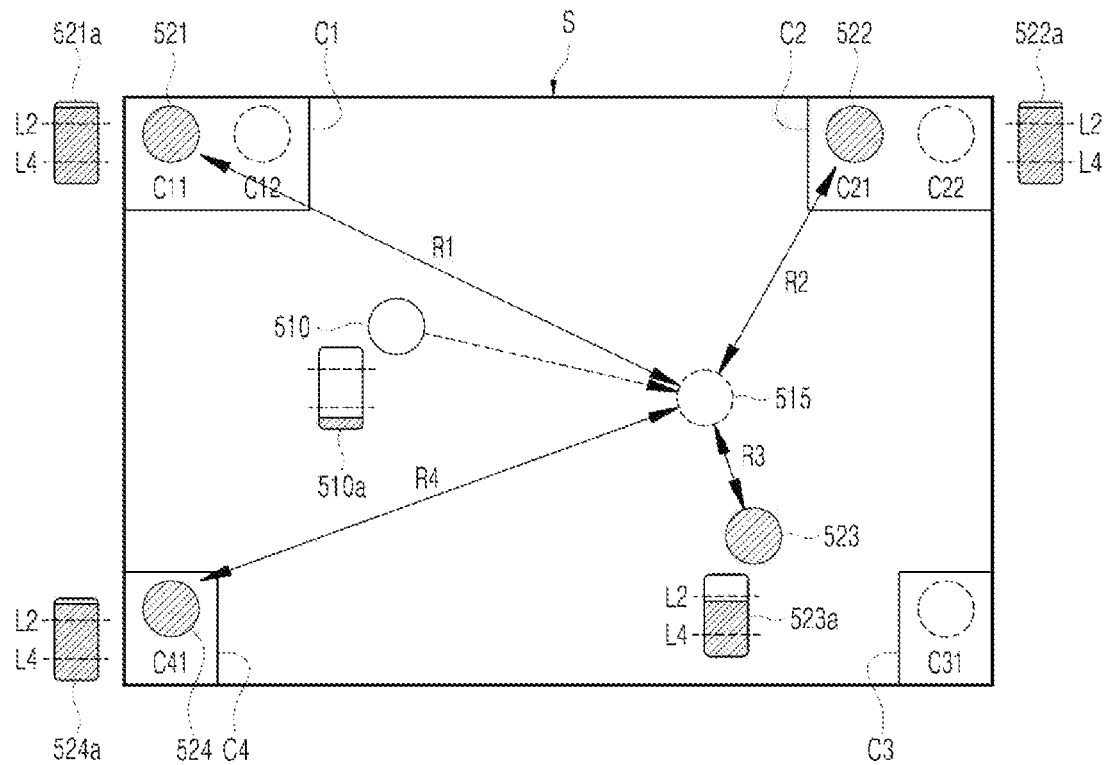
FIG. 5 is another exemplary diagram for explaining a method of determining a charging robot in a robot system according to an embodiment of the present disclosure.

FIG. 5 is another exemplary diagram for explaining a method of determining a charging robot in a robot system according to an embodiment of the present disclosure. FIG. 5 illustrates a situation that the charging robot is dispatched to charge a service robot 510. Detailed description for substantially common parts to FIG. 4 will be omitted.

The service robot 510 may provide a service while continuously moving. In this case, according to the embodiment illustrated in FIG. 4, an undesirable charging robot can be selected. Therefore, the control server 120 may determine the charging robot by additionally considering an expected route of the service robot 510.

In an embodiment, when the battery level of the service robot 510 falls below the first threshold level L1, the control server 120 may determine an expected position from the expected route of the service robot 510. In the present disclosure, the expected position indicates a position where the service robot 510 is expected to move after the present time.

As illustrated in FIG. 5, the control server 120 may determine a specific position on the expected route of the service robot 510 as the expected position 515. The expected route and the expected position may be derived based on a current moving speed of the service robot 510, a destination or a waypoint of the service which is being provided by the service robot 510, or any combinations thereof.

In an embodiment, the control server 120 may determine a charging robot based on distances R1, R2, R3, and R4 between the expected position 515 of the service robot 510 and standby robots 521, 522, 523, and 524 and the battery levels of the standby robots 521, 522, 523, and 524.

In an embodiment, the control server 120 may select robots having a higher battery level than the second threshold level L2 from the standby robots 521, 522, 523, and 524 and determine a robot which is the closest to the expected position 515 of the service robot 510 among the selected robots as a charging robot. For example, in FIG. 5, a standby robot 522 which is the closest to the expected position 515 of the service robot 510 among the standby robots 521, 522, and 524 having a higher battery level than the second threshold level L2 may be determined as a charging robot. In another embodiment, the control server 120 may select robots located within a range determined in advance from the expected position 515 of the service robot 510 and determine a robot having a highest battery level among the selected robots as a charging robot.

The control server 120 may transmit an instruction to move to a target position to the determined charging robot. The charging robot which receives the instruction may move to the target position to charge the service robot 510. In the embodiment, the target position may be the expected position 515 of the service robot 510. For example, the standby robot 522 which receives the instruction from the control server 120 in FIG. 5 moves to the expected position of the service robot 510 to charge the charging robot 510.

Figure 6:
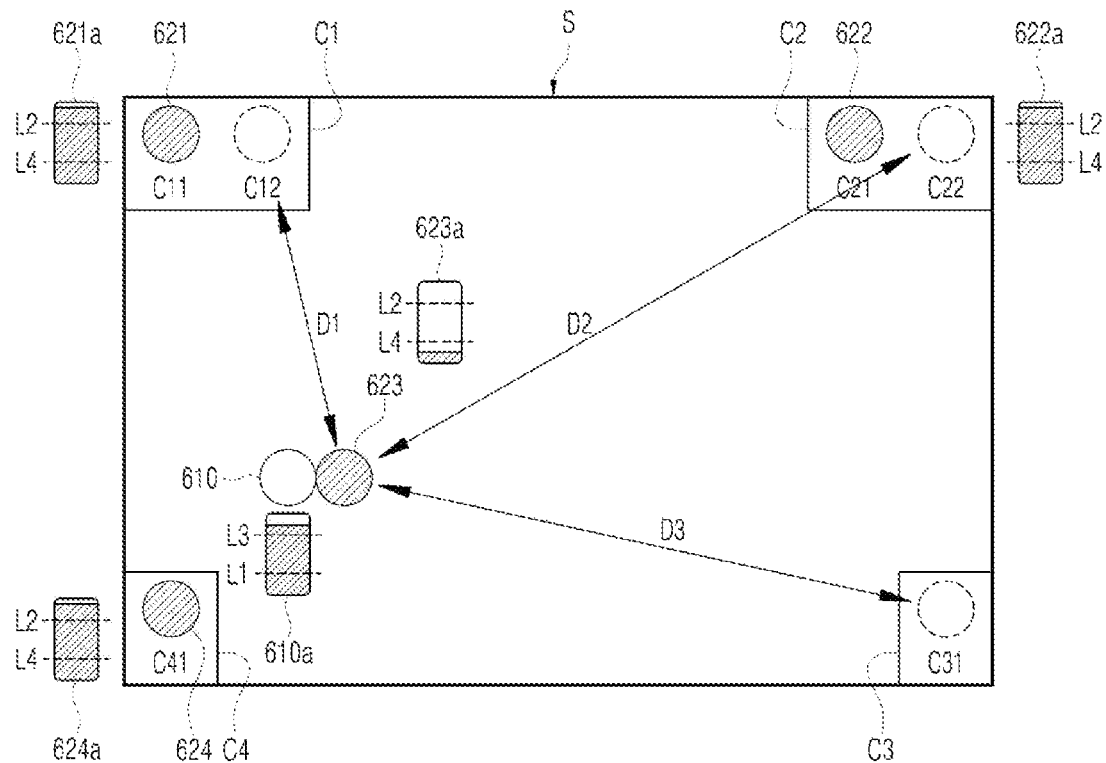
FIG. 6 is an exemplary diagram for explaining a method of returning a charging robot in a robot system according to an embodiment of the present disclosure.

FIG. 6 is an exemplary diagram for explaining a method of returning a charging robot in a robot system according to an embodiment of the present disclosure. FIG. 6 illustrates a situation for returning a charging robot to a charging station.

Referring to FIG. 6, a charging robot 623 is charging a service robot 610. When a specific condition is satisfied, the control server 120 may stop charging the service robot 610 by the charging robot 623 and return the charging robot 623 to any one of charging stations C1, C2, C3, and C4.

The control server 120 may monitor the battery levels of the service robot 610 and the charging robot 623 and stop charging based on the battery level of the service robot 610 which exceeds the third threshold level L3 or the battery level of the charging robot 623 which falls below the fourth threshold level L4.

In an aspect, when the battery level of the service robot 610 exceeds the third threshold level L3 or the battery level of the charging robot 623 falls below the fourth threshold level L4, the control server 120 may stop charging.

In another aspect, the control server 120 may stop charging only when the battery level of the service robot 610 exceeds the third threshold level L3. That is, the control server 120 may not consider the battery level of the charging robot 623. In this case, it may be determined whether to dispatch an additional charging robot to charge the charging robot 623 in accordance with a remaining battery level of the charging robot 623.

In still another aspect, the control server 120 may stop charging only when the battery level of the charging robot 623 falls below the fourth threshold level L4. In other words, the control server 120 may not consider the battery level of the service robot 610. In this case, it may be determined whether to dispatch an additional charging robot to charge the service robot 610.

When it is determined to stop charging, the control server 120 may determine a charging station to which the charging robot 623 will return, based on distances between the charging robot 623 and the charging stations, a number of empty charging spaces of each charging station, a number of standby robots located in each charging station, an occupancy ratio of each charging station, or any combinations thereof. The control server 120 may prefer a charging station which is closer to the charging robot 623, a charging station having more empty charging spaces, a charging station having a smaller number of standby robots, or a charging station having a lower occupancy ratio.

In FIG. 6, the charging station C1 has one empty charging space C12 and an occupancy ratio of the charging station C1 is 50%. The charging station C2 has one empty charging space C22 and an occupancy ratio of the charging station C2 is 50%. The charging station C3 has one empty charging space C31 and an occupancy ratio of the charging station C3 is 0%. The charging station C4 does not have an empty charging space and an occupancy ratio of the charging station C4 is 100%.

In an embodiment, the control server 120 may select charging stations having an empty charging space or charging stations having a predetermined occupancy ratio or lower as candidate charging stations. The control server 120 may determine a charging station which is the closest to the charging robot 623 among the selected charging stations as a charging station to which the charging robot 623 will return. For example, in FIG. 6, the charging stations C1, C2, and C3 having at least one empty charging space or an occupancy ratio of 50% or lower may be selected as candidate charging stations. The charging station C1 which is the closest may be determined as a charging station to which the charging robot 623 will return, based on the distances D1, D2, and D3 between the selected candidate charging stations C1, C2, and C3 and the charging robot 623.

The control server 120 may transmit an instruction to return to the determined charging station to the charging robot 623. The instruction may include information about an empty charging space of the charging station to which the charging robot 623 will move. The charging robot which receives the instruction may return to the charging station. For example, in FIG. 6, the charging robot 623 returns to the charging space C12 of the charging station C1.

Figure 7:
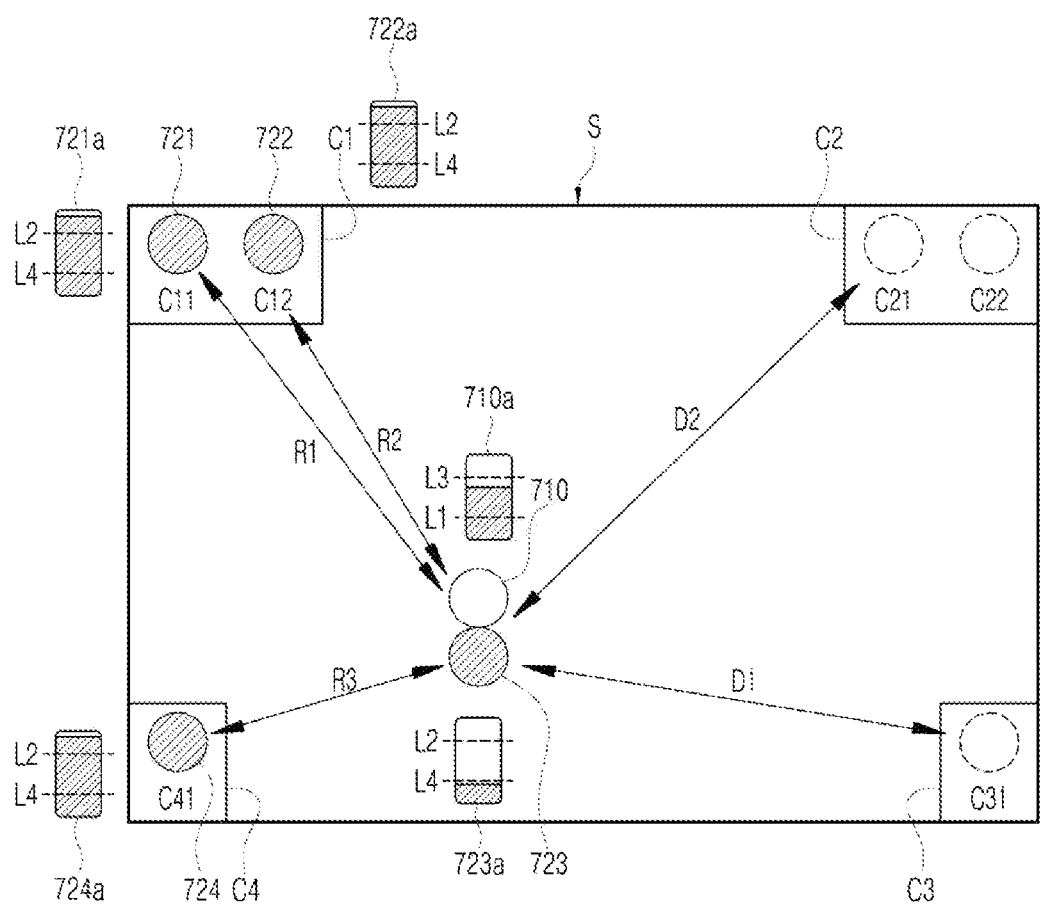
FIG. 7 is another exemplary diagram for explaining a method of returning a charging robot in a robot system according to an embodiment of the present disclosure.

FIG. 7 is another exemplary diagram for explaining a method of returning a charging robot in a robot system according to an embodiment of the present disclosure. FIG. 7 illustrates a situation for dispatching an additional charging robot to return a charging robot to the charging station.

Referring to FIG. 7, a charging robot 723 is charging a service robot 710. When the battery level of the charging robot 723 falls below the fourth threshold level L4, the control server 120 may determine a charging station to which the charging robot 723 will return.

However, the occupancy ratios of the charging stations C1, C2, C3, and C4 and positions of other standby robots 721, 722, and 724 may be continuously changed while the charging robot 723 charges the service robot 710. Therefore, there may be no charging station to which the charging robot 723 can return.

For example, as illustrated in FIG. 7, the charging stations C1 and C4 which are close to the charging robot 723 do not have an empty charging space and the charging stations C2 and C3 which are relatively spaced apart from the charging robot 723 may have an empty charging space. The control server 120 may consider the charging station C3 as a charging station to which the charging robot 723 will return, based on the distances D1 and D2 between the charging robot 723 and the charging stations C3 and C2. However, if the remaining battery level of the charging robot 723 does not guarantee the movement to the charging station C3, there may be no charging station to which the charging robot 723 can return.

In this situation, the control server 120 may dispatch an additional charging robot to charge at least one of the charging robot 723 or the service robot 710. The above-described charging robot determining method may be applied to determine an additional charging robot.

The control server 120 may determine an additional charging robot to charge the charging robot 723 and/or the service robot 710 from the standby robots 721, 722, and 724. The control server 120 may determine an additional charging robot based on distances R1, R2, and R3 between the charging robot 723 and the standby robots 721, 722, and 724 and the battery levels of the standby robots 721, 722, and 724.

In an embodiment, the control server 120 may select robots having a higher battery level than the second threshold level L2 from the standby robots 721, 722, and 724 and determine a robot which is the closest to the charging robot 723 among the selected robots as an additional charging robot. For example, in FIG. 7, a standby robot 724 which is the closest to the charging robot 723 among the standby robots 721, 722, and 724 having a higher battery level than the second threshold level L2 may be determined as an additional charging robot.

The control server 120 may transmit an instruction to move to a target position to the determined additional charging robot. The target position may be a current position or an expected position of the charging robot 723 or a current position or an expected position of the service robot 710. The additional charging robot which receives the instruction may move to the target position to charge the charging robot 723 and/or the service robot 710.

After determining the additional charging robot, various operation scenarios may be defined. In FIG. 7, when the standby robot 724 is dispatched, the charging space C41 of the charging station C4 will be empty. In one aspect, when the remaining battery level of the charging robot 723 guarantees the movement to the charging station C4, the control server 120 may return the charging robot 723 to the charging station C4. The additional charging robot 724 continuously charges the service robot 710 instead of the charging robot 723.

In another aspect, when the remaining battery level of the charging robot 723 does not guarantee the movement to the charging station C4, the control server 120 may cause the additional charging robot 724 to charge the charging robot 723. In this case, the charging robot 723 may be charged only to be able to return to the charging station C4. After returning the charging robot 723, the control server 120 also may cause the additional charging robot 724 to charge the service robot 710 based on the battery levels of the additional charging robot 724 and the service robot 710.

Figure 8:
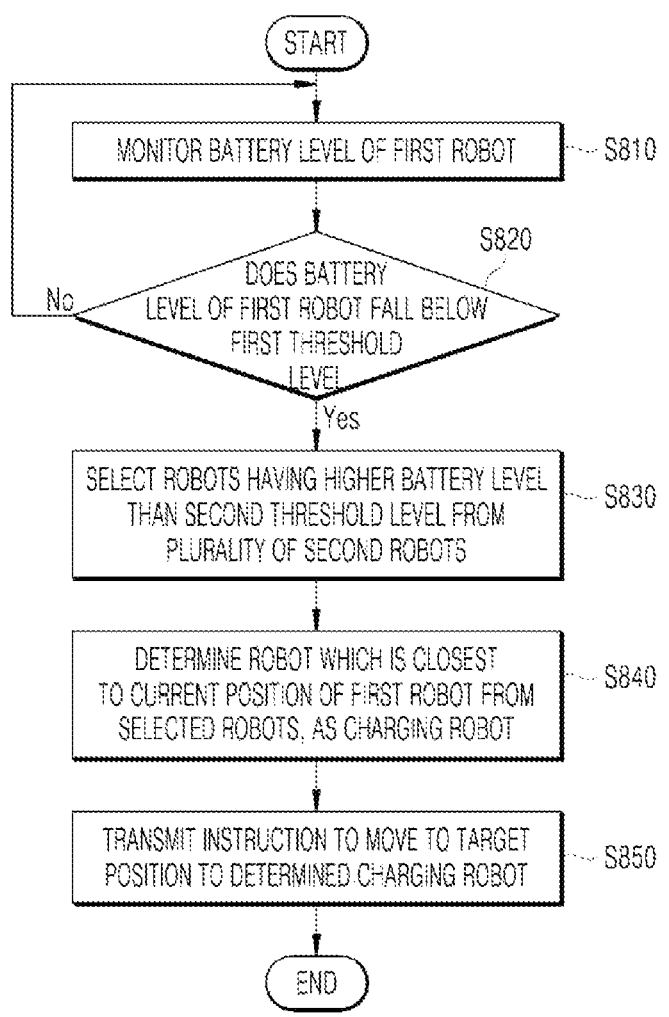
FIG. 8 is a flowchart illustrating a method for charging a robot according to an embodiment of the present disclosure.

FIG. 8 is a flowchart illustrating an operation flow of a method for charging a robot according to an embodiment of the present disclosure. The method illustrated in FIG. 8 may be performed by the control server 120 of FIG. 1. In the present embodiment, a first robot may be a service robot and a second robot may be a standby robot.

In step S810, the control server 120 monitors a battery level of the first robot. The monitoring of the battery level of the first robot may include receiving information about a battery level from the first robot.

In step S820, the control server 120 determines whether the battery level of the first robot falls below a first threshold level. If the battery level of the first robot does not drop below a first threshold level, the control server 120 continuously monitors the battery level of the first robot. The first threshold level may be a battery level indicating that it is necessary to charge the battery of the first robot.

When the battery level of the first robot falls below the first threshold level, the control server 120 may determine a charging level at least partially based on distances between the first robot and the second robots and battery levels of the second robots.

In step S830, when the battery level of the first robot falls below the first threshold level, the control server 120 may select robots having a battery level higher than the second threshold level from the plurality of second robots. The second threshold level may be a minimum battery level required for the second robot to charge the first robot.

In step S840, the control server 120 may determine a robot which is the closest to the current position of the first robot among the selected robots as a charging robot.

In step S850, the control server 120 transmits an instruction to move to a target position to the determined charging robot. The target position may be a current position of the first robot.

The embodiment illustrated in FIG. 8 may be applied when the first robot provides a service in a stop state or provides a service in a comparatively narrow range.

Figure 9:
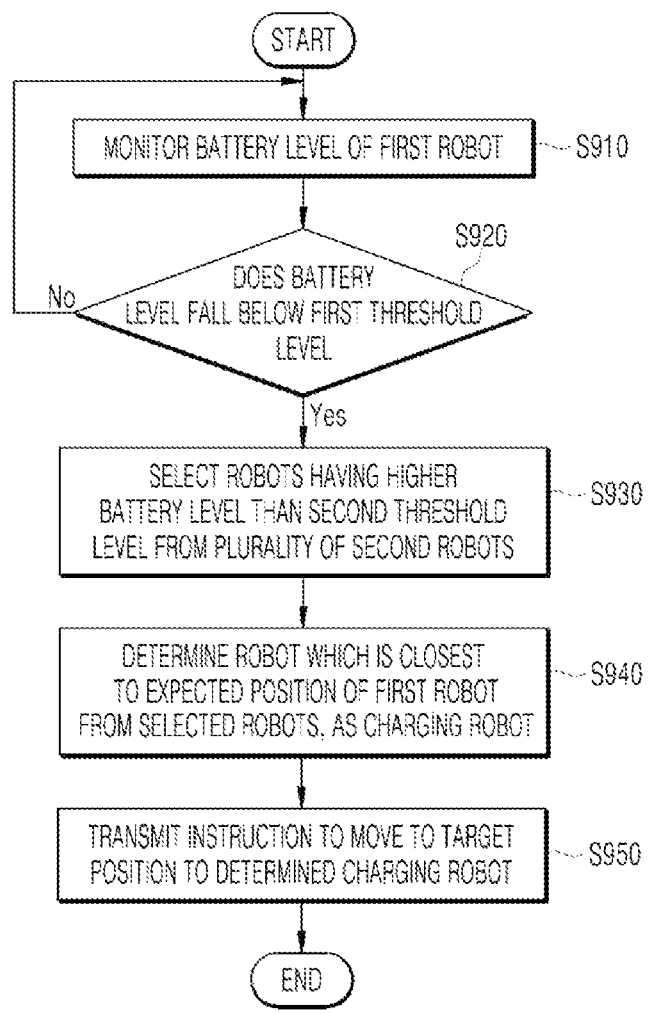
FIG. 9 is a flowchart illustrating a method for charging a robot according to an embodiment of the present disclosure.

FIG. 9 is a flowchart illustrating a method for charging a robot according to an embodiment of the present disclosure. The method illustrated in FIG. 9 may be performed by the control server 120 of FIG. 1. In the present embodiment, a first robot may be a service robot and a second robot may be a standby robot.

According to the method illustrated in FIG. 8, the charging robot is determined with respect to the current position of the first robot, but according to the method illustrated in FIG. 9, the charging robot is determined with respect to an expected position of the first robot.

The detailed descriptions of steps S910 to S930 which are substantially the same as steps S810 to S830 of FIG. 8 will be omitted.

In step S940, the control server 120 determines a robot which is the closest to the expected position of the first robot among the selected robots as a charging robot. The expected position may be a specific position on an expected route of the first robot. The expected position may be derived based on a current moving speed of the first robot, a destination or a waypoint of the service which is being provided by the first robot, or any combinations thereof.

In step S950, the control server 120 transmits an instruction to move to a target position to the determined charging robot. The target position may be an expected position of the first robot.

The embodiment illustrated in FIG. 9 may be applied when the first robot provides a service while moving or provides a service over a comparatively broad range.

Figure 10:
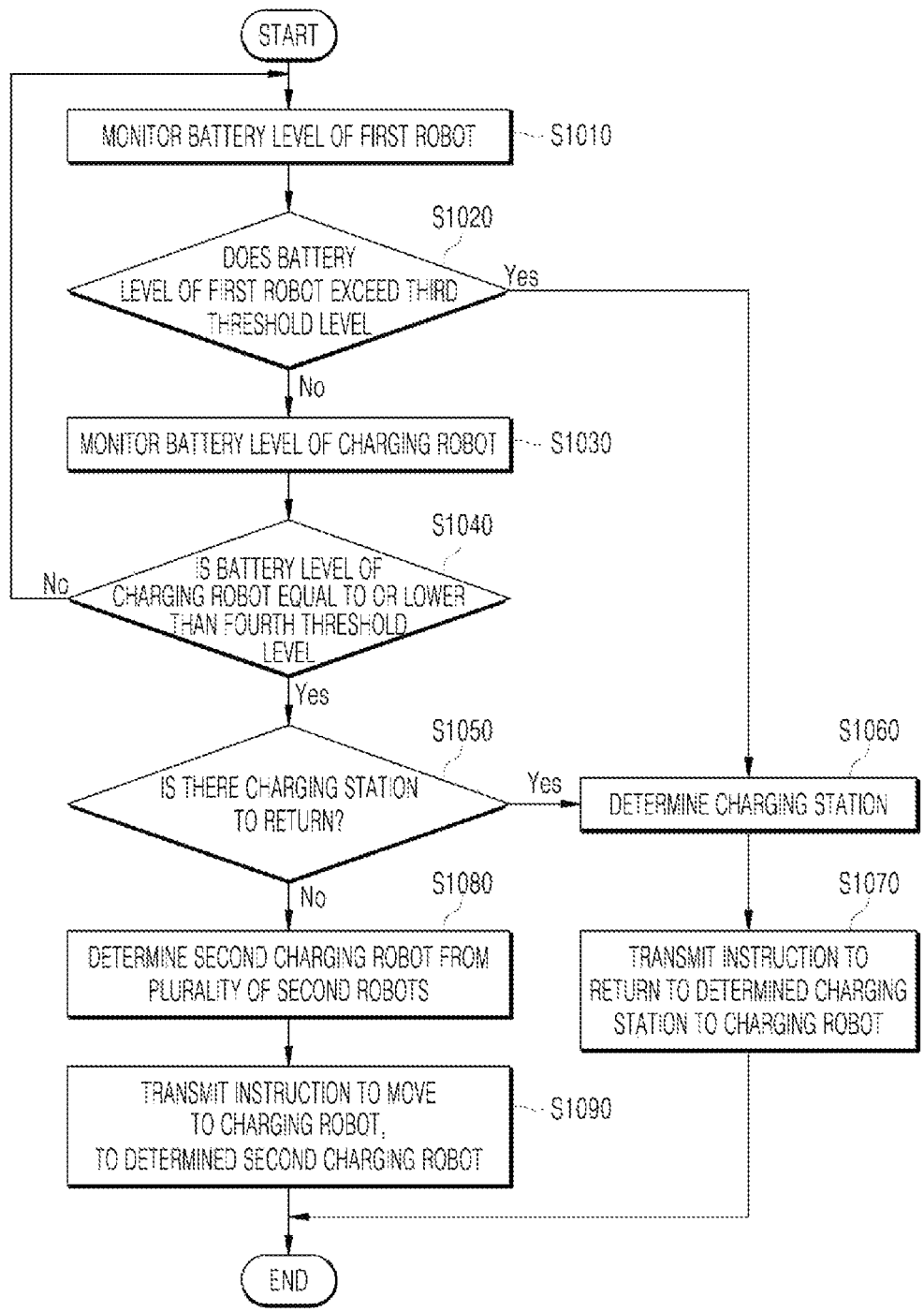
FIG. 10 is a flowchart illustrating a method for charging a robot according to an embodiment of the present disclosure.

FIG. 10 is a flowchart illustrating a method for charging a robot according to an embodiment of the present disclosure. The method illustrated in FIG. 10 may be performed by the control server 120 of FIG. 1. In the present embodiment, the first robot may be a service robot, the second robot may be a standby robot, and a second charging robot may be an additional charging robot.

In step S1010, the control server 120 monitors a battery level of the first robot. In step S1020, the control server 120 confirms whether a battery level of the first robot exceeds a third threshold level. The third threshold level may be a battery level indicating that it is not necessary to charge the battery of the first robot.

When the battery level of the first robot exceeds the third threshold level, in step S1060, the control server 120 determines a charging station to which the charging robot will return. The control server 120 may determine a charging station to which the charging robot will return based on distances between the charging robot and the charging stations, a number of empty charging spaces of each charging station, a number of standby robots located in each charging station, an occupancy ratio of each charging station, or any combinations thereof.

In step S1070, the control server 120 may transmit an instruction to return to the determined charging station to the charging robot.

When the battery level of the first robot does not exceed the third threshold level, in step S1030, the control server 120 monitors a battery level of the charging robot. In step S1040, the control server 120 confirms whether the battery level of the charging robot is equal to or lower than the fourth threshold level. The fourth threshold level may be a minimum battery level required for the charging robot to return to the charging station.

When the battery level of the charging robot is equal to or lower than the fourth threshold level, in step S1050, the control server 120 determines whether there is a charging station to which the charging robot can return.

When there is a charging station to which the charging robot can return, the above-described steps S1060 and S1070 are performed.

When there is no charging station to which the charging robot can return, in step S1080, the control server 120 may determine a second charging robot for charging the charging robot and/or the first robot from the plurality of second robots.

In step S1090, the control server 120 may transmit an instruction to return to the charging robot to the determined charging robot.

Figure 11:
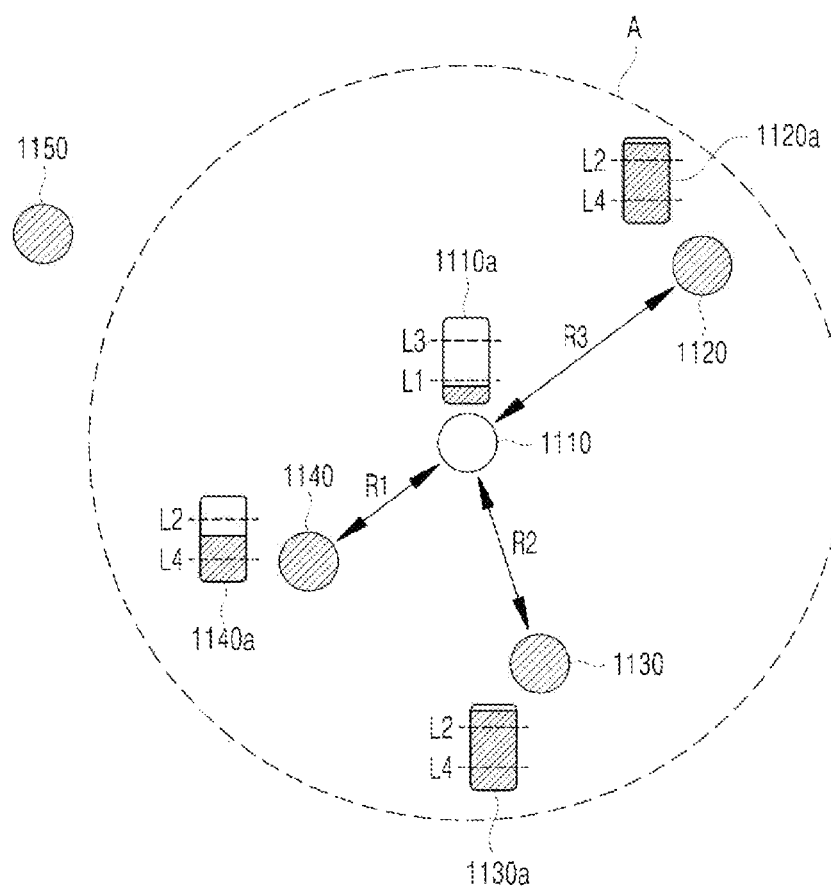
FIG. 11 is a view illustrating a robot system according to another embodiment of the present disclosure.

FIG. 11 is a view illustrating a robot system according to another embodiment of the present disclosure.

In the above-described embodiments, the control server 120 controls an operation of dispatching and returning the charging robot. However, robots including a charger may communicate with each other to perform charging without being controlled by the control server 120.

Referring to FIG. 11, a plurality of robots 1110, 1120, 1130, 1140, and 1150 may be provided. The robots 1110, 1120, 1130, 1140, and 1150 may have a charger 295 including a power transmission module 295a and a power reception module 295b. Further, the robots 1110, 1120, 1130, 1140, and 1150 may be connected to be communicable with each other. The robots 1110, 1120, 1130, 1140, and 1150 may communicate with each other through the control server 120 or may directly communicate with each other without passing through the control server 120.

In FIG. 11, the robot 1110 may be a service robot and the remaining robots 1120, 1130, 1140, and 1150 may be standby robots, but the present disclosure is not limited thereto. For convenience, a charging operation will be described from the viewpoint of the robot 1110.

The robot 1110 monitors its battery level. When the battery level falls below the first threshold level L1, the robot 1110 may broadcast a first message indicating that it is necessary to charge the battery. The first message may include information about a position and a battery level of the robot 1110. Referring to FIG. 11, the broadcast first message may be received by the robots 1120, 1130, and 1140 located within a wireless coverage A of the robot 1110. Since the robot 1150 is out of the wireless coverage A of the robot 1110, the robot 1150 cannot receive the first message.

The robots 1120, 1130, and 1140 which receive the first message generate a response message including its status information including a battery level and a position and transmit the generated response message to the robot 1110. In an embodiment, even though a robot which is providing a service or charging the other robot, among the robots 1120, 1130, and 1140, receives the first message, the robot may not transmit the response message. In other words, only the standby robots among the robots 1120, 1130, and 1140 may generate and transmit the response message to the first message.

The robot 1110 may determine a charging robot based on the response message received from the robots 1120, 1130, and 1140. Specifically, the robot 1110 may determine a charging robot based on distances R1, R2, and R3 between the current position of the robot 1110 and the robots 1120, 1130, and 1140 and battery levels of the robots 1120, 1130, and 1140. In another embodiment, the robot 1110 may also determine a charging robot based on distances R1, R2, and R3 between an expected position of the robot 1110 and the robots 1120, 1130, and 1140 and battery levels of the robots 1120, 1130, and 1140.

The robot 1110 may select robots having a higher battery level than the second threshold level L2 from the robots 1120, 1130, and 1140 and determine a robot which is the closest to the current position or the expected position of the robot 1110 among the selected robots as a charging robot. In FIG. 11, battery states 1110a, 1120a, 1130a, and 1140a of the robots 1110, 1120, 1130, and 1140 are illustrated. In an embodiment, the robot 1110 may select robots 1120 and 1130 having a higher battery level than the second threshold level L2, among the robots 1120, 1130, and 1140 which transmitted a response message. The robot 1110 may determine a robot 1130 which is the closest to the current position of the robot 1110 among the selected robots 1120 and 1130 as a charging robot. In another embodiment, when the robot 1110 is expected to move to the direction of the robot 1120, the robot 1110 considers the expected position to determine the robot 1120, instead of the robot 1130, as a charging robot.

The robot 1110 may transmit a second message to move to a target position, to the determined charging robot. The charging robot which receives the instruction may move to the target position to charge the robot 1110. The target position may be the current position or the expected position of the robot 1110.

According to the above-described embodiments, the first robot broadcasts the first message indicating that it is necessary to charge the battery to request charging. However, according to another embodiment, each robot may periodically broadcast its position and battery level. In this case, the first robot which needs to charge the battery may determine a charging robot based on status information of surrounding robots which is periodically collected, without broadcasting the first message.

Figure 12:
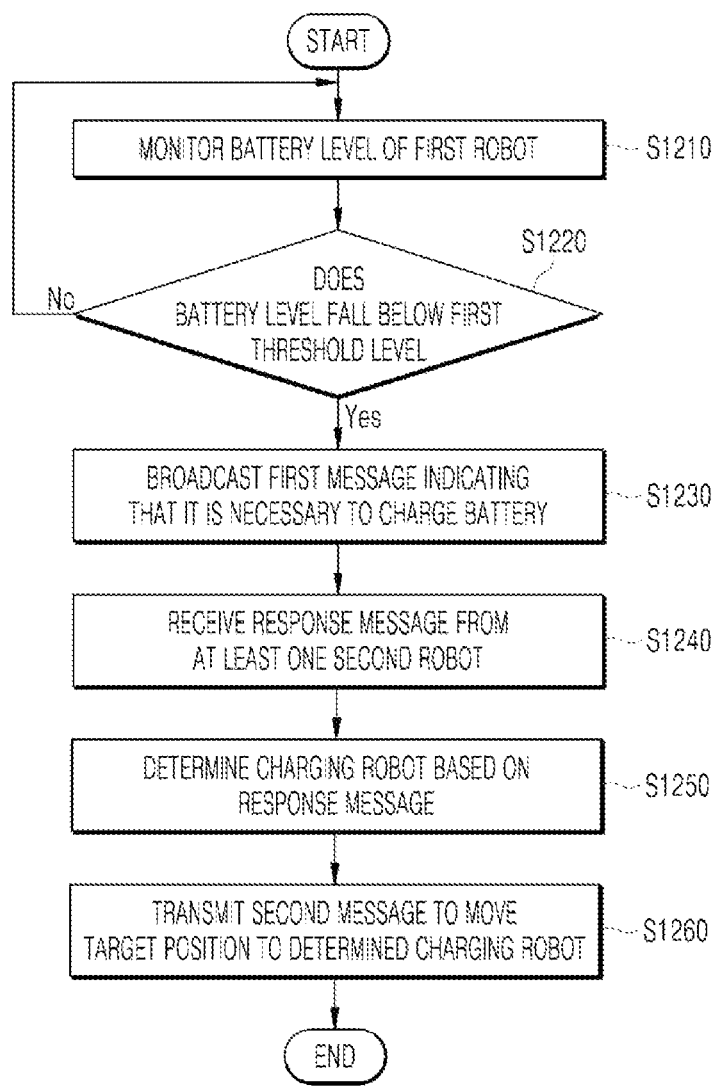
FIG. 12 is a flowchart illustrating an operation flow of a method for charging a robot according to another embodiment of the present disclosure.

FIG. 12 is a flowchart illustrating an operation flow of a method for charging a robot according to another embodiment of the present disclosure. The method illustrated in FIG. 12 may be performed by a first robot which requests charging. The first robot may be a service robot.

In step S1210, the first robot monitors its battery level.

In step S1220, the first robot confirms whether the battery level falls below the first threshold level. When the battery level does not drop below the first threshold level, the first robot continuously monitors its battery level.

In step S1230, when the battery level of the first robot falls below the first threshold level, the first robot broadcasts a first message indicating that it is necessary to charge the battery. The first message may include information about a position and a battery level of the first robot.

In step S1240, the first robot receives a response message from at least one second robot which receives the first message. The response message may include information about the battery level and the position of the second robot.

In step S1250, the first robot determines a charging robot based on the response message. In an embodiment, the first robot may determine a charging robot based on distances between the current position of the first robot and the second robots and the battery levels of the second robots. In another embodiment, the first robot may determine a charging robot based on distances between the expected position of the first robot and the second robots and the battery levels of the second robots.

In step S1260, the first robot transmits a second message to move to the target position to the determined charging robot. The target position may be the current position or the expected position of the first robot.

Figure 13:
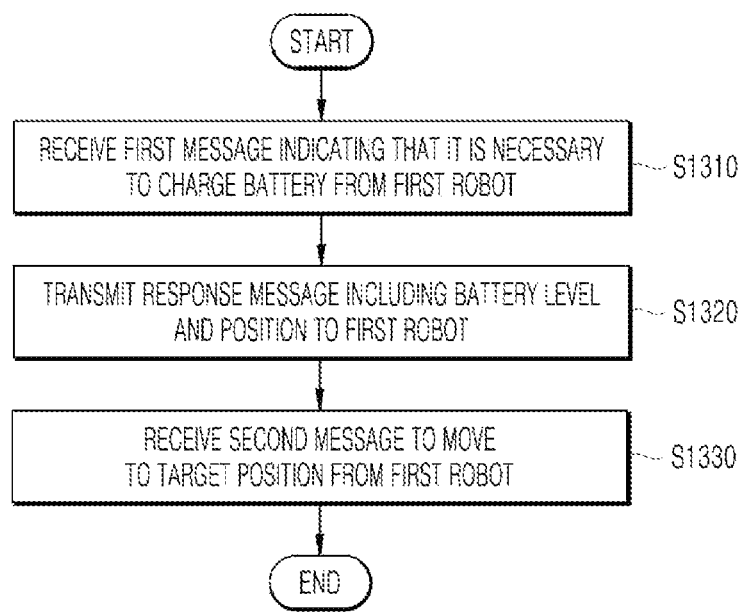
FIG. 13 is a flowchart illustrating an operation flow of a method for charging a robot according to another embodiment of the present disclosure.

FIG. 13 is a flowchart illustrating an operation flow of a method for charging a robot according to another embodiment of the present disclosure. The method illustrated in FIG. 13 may be performed by a second robot requested to charge. The second robot may be a standby robot.

In step S1310, the second robot receives a first message indicating that it is necessary to charge the battery from a first robot.

In step S1320, the second robot generates a response message including its battery level and position and transmits the response message to the first robot.

In step S1330, the second robot receives a second message to move to the target position from the first robot. In this case, the second robot may move to the target position to charge the first robot.

When the first robot does not determine the second robot as a charging robot, the second message from the first robot may not be received. In this case, the second robot will maintain a standby state.

Figure 14:
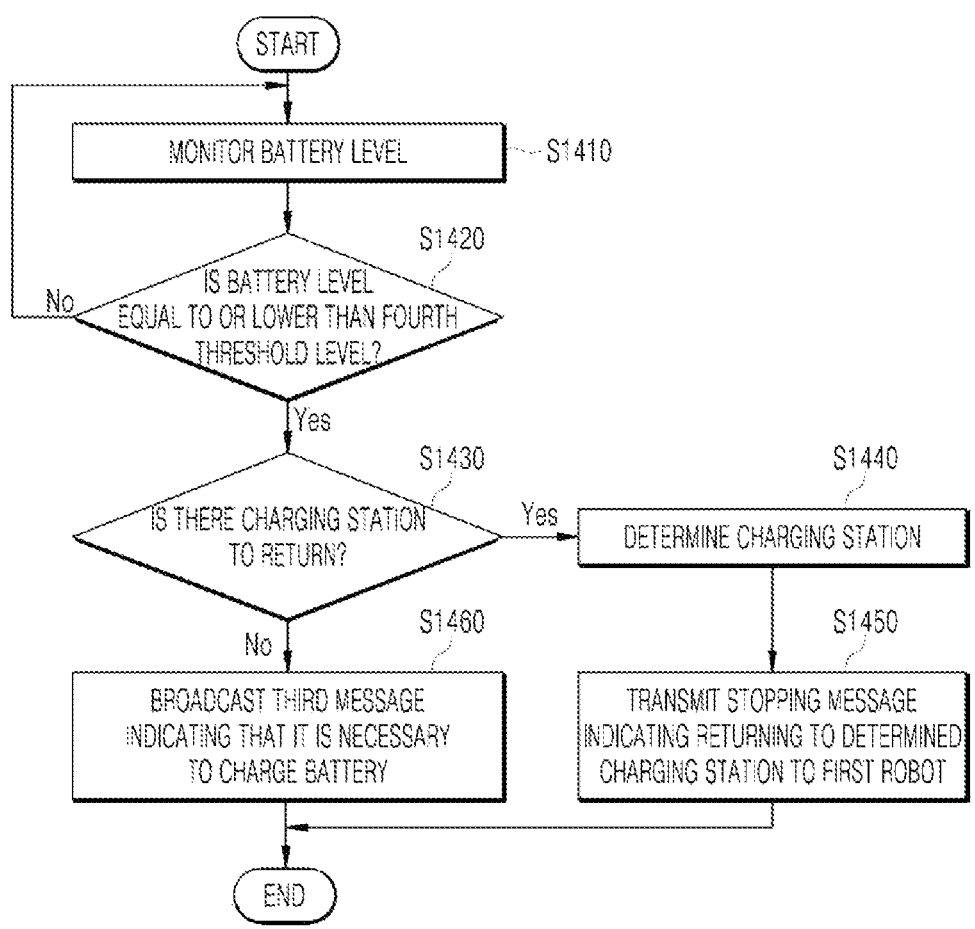
FIG. 14 is a flowchart illustrating an operation flow of a method for charging a robot according to another embodiment of the present disclosure.

FIG. 14 is a flowchart illustrating an operation flow of a method for charging a robot according to another embodiment of the present disclosure. The method illustrated in FIG. 14 may be performed by a charging robot which is charging a first robot.

In step S1410, the charging robot monitors its battery level.

In step S1420, the charging robot confirms whether its battery level is equal to or lower than the fourth threshold level. When the battery level does not drop below the fourth threshold level, the charging robot continuously monitors its battery level.

In step S1430, when its battery level is equal to or lower than the fourth threshold level, the charging robot confirms whether there is a charging station to return.

When there is a charging station to which the charging robot can return, in step S1440, the charging robot determines a charging station to return. The charging robot may determine a charging station to return based on distances to the charging stations, a number of empty charging spaces of each charging station, a number of standby robots located in each charging station, an occupancy ratio of each charging station, or any combinations thereof.

In step S1450, the charging robot may transmit a stop message indicating the returning to the determined charging station to the first robot. Thereafter, the charging robot may return to the determined charging station.

When there is no charging station to which the charging robot can return, in step S1460, the charging robot may broadcast a third message indicating that it is necessary to charge the battery. The broadcasting of the third message in step S1460 may be substantially the same as the broadcasting of the first message in step S1230 of FIG. 12. Therefore, when a response message is received from another standby robot in response to the third message, the charging robot may determine a second charging robot to charge the charging robot based on the response message.

In the meantime, referring to FIG. 2 again, in the embodiment, the robot 200 may further include a learning processor 260 which performs an operation related to the artificial intelligence and/or the machine learning.

Artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The learning processor 260 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation.

The learning processor 260 may train the artificial neural network by using one or more various parameters used to determine a charging robot as learning data.

In an embodiment, the learning processor 260 may train the artificial neural network by using the battery level and the position of the service robot, the battery level and the position of the standby robots and the determined charging robot as learning data.

In an embodiment, the learning processor 260 uses the battery level and the position of the service robot and the battery level and the position of the standby robot as input data for the artificial neural network based learning model to determine the charging robot.

Figure 15:
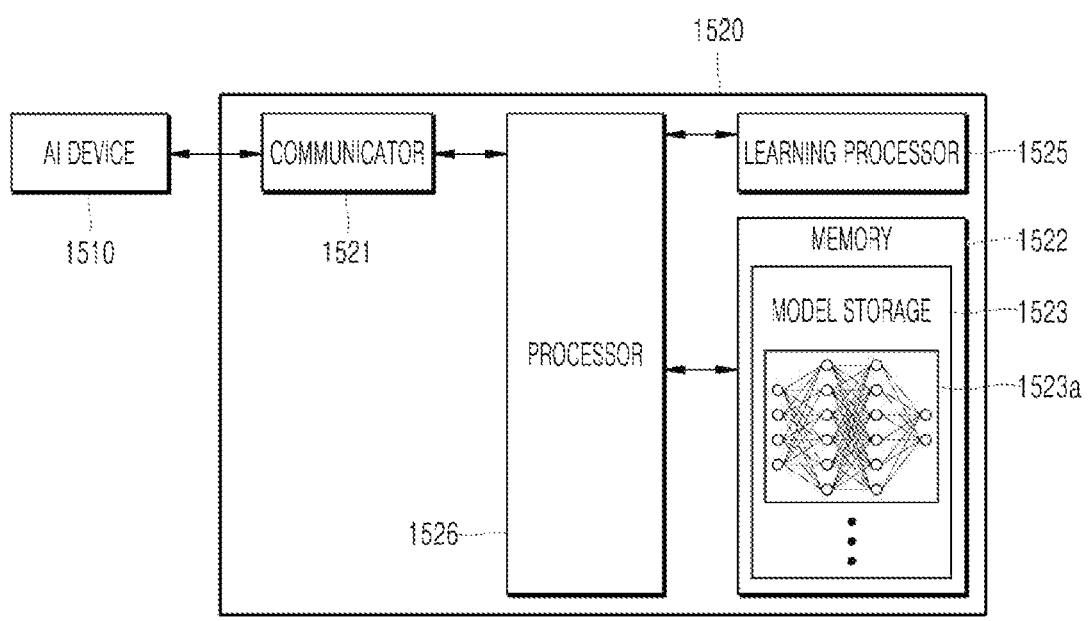
FIG. 15 is a view illustrating a robot system according to another embodiment of the present disclosure.

The learning processor 260 may perform artificial intelligence or machine learning processing together with a learning processor 1525 of an AI server 1520 of FIG. 15. The learning processor 260 may include a memory integrated or implemented in the robot 200. Alternatively, the learning processor 260 may be implemented by using the memory 280, an external memory directly coupled to the robot 200, or a memory maintained in an external device.

FIG. 15 is a view illustrating a robot system according to another embodiment of the present disclosure. In an embodiment, a robot system may be implemented as an AI system capable of performing artificial intelligence or machine learning. Referring to FIG. 15, a robot system according to another embodiment of the present disclosure may include an AI device 1510 and the AI server 1520.

In an embodiment, the AI device 1510 may be the robot 110, the control server 120, the terminal 130 of FIG. 1, or the robot 200 of FIG. 2. The AI server 1520 may be a control server 120 of FIG. 1.

The AI server 1520 may refer to a device using a trained artificial neural network or a device training an artificial neural network by using a machine learning algorithm. The AI server 1520 may be composed of a plurality of servers to perform distributed processing. The AI server 1520 is included as a partial configuration of the AI device 1510 and may perform at least partial artificial intelligence or machine learning processing.

The AI server 1520 may include a communicator 1521, a memory 1522, a learning processor 1525, and a processor 1526.

The communicator 1521 may transmit and receive data with an external device such as the AI device 1510.

The memory 1522 may include a model storage 1523. The model storage 1523 may store a model (or an artificial neural network 1523a) learning or learned via the learning processor 1525.

The learning processor 1525 may train the artificial neural network 1523a by using learning data. The learning model may be used while mounted in the AI server 1520 of the artificial neural network, or may be used while mounted in an external device such as the AI device 1510.

The learning model may be implemented as hardware, software, or a combination of hardware and software. When a portion or the entirety of the learning model is implemented as software, one or more instructions, which constitute the learning model, may be stored in the memory 1522.

The processor 1526 may infer a result value with respect to new input data by using the learning model, and generate a response or control command based on the inferred result value.

The example embodiments described above may be implemented through computer programs executable through various components on a computer, and such computer programs may be recorded on computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A method for charging, the method comprising:
monitoring a battery level of a first robot for providing a service;

determining a charging robot which drives using an actuator or a motor for charging the first robot from a plurality of second robots, which are providing another service or waiting for a service request for the other service, in response to a battery level of the first robot falling below a first threshold level, wherein the charging robot is determined based on at least one of distances between the first robot and the plurality of second robots or battery levels of the plurality of second robots; and transmitting an instruction to the determined charging robot to cause the determined charging robot to move to a target position to charge the first robot without interrupting the service of the first robot according to the instruction, wherein the target position is a position along a determined route of the first robot providing the service while continuously moving, wherein the charging robot is for providing the other service, wherein the determined route is a destination or a waypoint of the service which is being provided by the first robot.

2. The method of claim 1, wherein the determining the charging robot comprises:

selecting robots from the plurality of second robots, each of the selected robots having a battery level that is higher than a second threshold level; and determining one of the selected robots that is closest to a current position of the first robot as the charging robot.

3. The method of claim 2, further comprising:

determining the second threshold level based on an energy required by the first robot to finish the service.

4. The method of claim 1, wherein the determining the charging robot comprises:

selecting robots from the plurality of second robots based on selecting robots with a battery level higher than a second threshold level; and determining one of the selected robots that is closest to the position along the determined route of the first robot as the charging robot.

5. The method of claim 1, further comprising:

stopping charging the first robot by the charging robot in response to the battery level of the first robot exceeding a second threshold level;

determining a charging station to which the charging robot is to move; and transmitting a second instruction to the charging robot to cause the charging robot to move to the determined charging station according to the second instruction.

6. The method of claim 1, further comprising:

monitoring a battery level of the charging robot;

stopping charging the first robot by the charging robot in response to the battery level of the charging robot falling below a second threshold level;

determining a charging station to which the charging robot is to move; and transmitting a second instruction to the charging robot to cause the charging robot to move to the determined charging station according to the second instruction.

7. The method of claim 6, wherein the charging station is determined from among a plurality of charging stations based on at least one of distances between the charging robot and the plurality of charging stations, a number of available spaces at each charging station, or an occupancy ratio of each charging station.

8. The method of claim 6, further comprising:

determining the second threshold level based on at least one of distances between the charging robot and a plurality of charging stations, a number of empty spaces at each charging station, or an occupancy ratio of each charging station.

9. The method of claim 6, further comprising:

determining a second charging robot for charging at least one of the first robot or the charging robot from among the plurality of second robots when there is no charging station to send the charging robot to; and transmitting a third instruction to the determined second charging robot to cause the determined second charging robot to move to the first robot or the charging robot according to the third instruction.

10. The method of claim 1, further comprising:

training an artificial neural network using status information of the first robot, status information of the plurality of second robots, and the determined charging robot as learning data, wherein each of the status information includes a battery level and a position of a corresponding robot.

11. The method of claim 10, further comprising:

applying the status information of the first robot and the status information of the plurality of second robots to the artificial neural network to determine the charging robot.

12. A robot, comprising:

a transceiver; and a processor electrically coupled to the transceiver and configured to:

monitor a battery level of the robot;

broadcast, via the transceiver, a first message indicating that a battery needs to be charged in response to the battery level falling below a first threshold level within a wireless coverage of the robot;

receive, via the transceiver, at least one response message from one or more standby robots in response to the first message, each response message including a position and a battery level of a corresponding standby robot;

determine a charging robot from among the one or more standby robots based on the position and the battery level included in the at least one response message;

transmit, via the transceiver, a second message to the determined charging robot to cause the charging robot to move to a target position in response to the second message, wherein the target position is a position along a determined route of the robot providing a service; and cause the battery to charge without interrupting the service of the robot, wherein the charging robot is one of standby robots which finished providing another service and are waiting for a service request for the other service, wherein the determined route is a destination or a waypoint of the service which is being provided by the robot.

13. The robot of claim 12, wherein the processor is further configured to:

select robots from among the one or more standby robots in response to the at least one response message, wherein the selected robots have a battery level that is higher than a second threshold level; and determine one of the selected robots that is closest to a current position of the robot as the charging robot.

14. The robot of claim 12, wherein the processor is further configured to:
- select robots from among the one or more standby robots in response to the at least one response message, wherein the selected robots have a battery level that is higher than a second threshold level; and
- determine one of the selected robots that is closest to the position along the determined route of the robot as the charging robot.

15. The robot of claim 12, wherein the first message includes the battery level and a position of the robot.

16. A robot, comprising:
- a driver comprising an actuator or a motor;
- a transceiver; and
- a processor electrically coupled to the transceiver and configured to:
  - receive, via the transceiver, a first message from another robot which is providing a service, the first message indicating that a battery of the other robot needs to be charged when the robot is providing another service or waiting for a service request for the other service;
  - transmit, via the transceiver, a response message including a battery level and a position of the robot to the other robot in response to the first message;
  - receive, via the transceiver, a second message from the other robot in response to the response message, the second message requesting the robot to move to a target position to charge the other robot;
  - cause the robot to move to the target position using the actuator or the motor,
  - wherein the target position is a position along a determined route of the other robot providing the service while continuously moving; and
  - charge the other robot providing the service without interrupting the service provided by the other robot, wherein the robot is for providing the other service, wherein the determined route is a destination or a waypoint of the service which is being provided by the other robot.

17. The robot of claim 16, wherein the processor is further configured to:
- monitor a battery level of the robot;
- determine a charging station to move to when the battery level of the robot falls below a second threshold level; and
- transmit, via the transceiver, a stop message to the other robot, wherein the stop message indicates moving of the robot to the determined charging station.

18. The robot of claim 17, wherein the charging station is determined based on at least one of distances between the robot and charging stations, a number of empty spaces at each charging station, or an occupancy ratio of each charging station.

19. The robot of claim 17, wherein the processor is further configured to broadcast, via the transceiver, a third message indicating that a battery of the robot needs to be charged when there is no charging station to move to.

20. The robot of claim 19, wherein the processor is further configured to:
- receive, via the transceiver, a response message from at least one of one or more standby robots in response to the third message, wherein the response message comprises a position and a battery level of a corresponding standby robot;
- determine a charging robot from among the at least one of the one or more standby robots based on the position and the battery level included in the response message; and
- transmit, via the transceiver, a fourth message to the determined charging robot to cause the charging robot to move to a second target position to charge the robot in response to the fourth message.

\* \* \* \* \*